(12) United States Patent
Winkler et al.

(10) Patent No.: US 10,364,890 B2
(45) Date of Patent: Jul. 30, 2019

(54) DOUBLE CUP-SHAPED PISTON FOR A DISC BRAKE

(71) Applicant: Continental Teves AG & Co. oHG, Frankfurt (DE)

(72) Inventors: Thomas Winkler, Mainz (DE); Matthias Würz, Oberursel (DE); Jürgen Balz, Hünstetten-Oberlibbach (DE); Bernhard Schmittner, Frankfurt am Main (DE); Werner Denhard, Friedrichsdorf (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 143 days.

(21) Appl. No.: 15/537,735

(22) PCT Filed: Jan. 18, 2016

(86) PCT No.: PCT/EP2016/050899
§ 371 (c)(1),
(2) Date: Jun. 19, 2017

(87) PCT Pub. No.: WO2016/113426
PCT Pub. Date: Jul. 21, 2016

(65) Prior Publication Data
US 2018/0320788 A1    Nov. 8, 2018

(30) Foreign Application Priority Data

Jan. 16, 2015  (DE) .................. 10 2015 200 623
May 11, 2015  (DE) .................. 10 2015 208 732

(51) Int. Cl.
*F16J 1/00*      (2006.01)
*F16D 125/06*    (2012.01)

(52) U.S. Cl.
CPC .......... *F16J 1/001* (2013.01); *F16D 2125/06* (2013.01)

(58) Field of Classification Search
CPC .......... F16J 1/005; F16J 1/001; F16D 65/005; F16D 65/0979; F16D 2125/06; Y10T 29/49249
(Continued)

(56) References Cited

U.S. PATENT DOCUMENTS 3,532,030 A * 10/1970 Grenville ............... B23P 15/10
                                                     29/888.04
4,189,032 A *  2/1980 Farr ..................... F16D 55/224
                                                      188/73.44
(Continued)

FOREIGN PATENT DOCUMENTS

DE   1953541 A1   5/1971
DE   8434025 U1   3/1986
(Continued)

OTHER PUBLICATIONS

Trinkel (Chapter 4: ISO Symbols, Sep. 28, 2006, published on www.hydraylicspneumatics.com, retreived Jan. 22, 2019).*
(Continued)

*Primary Examiner* — F Daniel Lopez
*Assistant Examiner* — Richard C Drake
(74) *Attorney, Agent, or Firm* — RatnerPrestia

(57) ABSTRACT

A double cup-shaped piston for a disc brake including an electromechanical parking brake device. An aspect of the invention permits an improved compromise between easier operability, rationalized component logistics in piston production, reduced hydraulic volume uptake in cooperation with the wheel brake periphery, and enhanced fatigue strength under maximum collective stress, in particular for heavy-duty applications of a disc brake with an electrome- (Continued)

chanical parking brake device. The problem is solved by the presence of a piston wall, which is provided, on the one hand, to sit with a free edge on a rear plate of a friction lining, and wherein the piston, on the other hand, includes an integral dome which forms an open receptacle for an actuator arranged diametrically to the edge of the piston.

13 Claims, 2 Drawing Sheets

(58) Field of Classification Search
USPC .......................................................... 91/172
See application file for complete search history.

(56) References Cited

U.S. PATENT DOCUMENTS

| | | | |
|---|---|---|---|
| 4,331,221 A * | 5/1982 | Evans ............... | F16D 55/22655 188/73.31 |
| 4,678,065 A | 7/1987 | Erben et al. | |
| 4,918,806 A * | 4/1990 | Watanabe ............... | B23P 15/10 148/220 |
| 5,105,917 A * | 4/1992 | Sporzynski ............ | B21D 53/34 188/370 |
| 5,150,517 A * | 9/1992 | Martins Leites .... | B23K 20/129 29/888.04 |
| 5,484,041 A * | 1/1996 | Cadaret .................. | F16D 65/14 188/72.4 |
| 5,704,452 A * | 1/1998 | Maligne .............. | F16D 65/0979 188/73.38 |
| 5,988,044 A * | 11/1999 | Meyer ....................... | F16J 1/01 188/264 G |
| 6,146,727 A * | 11/2000 | Dannels ................ | B29C 43/183 188/264 G |
| 6,443,048 B1 * | 9/2002 | Fischbach ................ | F16J 1/006 92/222 |
| 6,637,317 B1 * | 10/2003 | Zeibig ..................... | B23P 15/10 92/129 |
| 6,854,271 B2 * | 2/2005 | Koberstein ........... | F16D 25/088 60/588 |
| 7,000,526 B2 * | 2/2006 | Bennett .................. | B21D 22/21 29/888.04 |
| 7,434,669 B2 | 10/2008 | Halasy-Wimmer et al. | |
| 7,584,693 B2 | 9/2009 | Iwata et al. | |
| 8,348,030 B2 * | 1/2013 | Alamin ..................... | B60T 1/08 188/370 |
| 8,869,677 B2 | 10/2014 | Koch et al. | |
| 9,151,385 B2 * | 10/2015 | Winkler ..................... | F16J 1/12 |
| 9,593,728 B2 * | 3/2017 | DeMorais ............. | B60T 13/741 |
| 2001/0025569 A1 * | 10/2001 | Suga ........................ | F16J 1/006 92/248 |
| 2002/0157906 A1 * | 10/2002 | Nagy .................... | B60T 8/4068 188/73.37 |
| 2008/0314239 A1 * | 12/2008 | Leidecker ............... | B23P 15/10 92/169.1 |
| 2011/0132188 A1 | 6/2011 | Winkler et al. | |
| 2011/0315007 A1 | 12/2011 | Koch et al. | |
| 2018/0266443 A1 * | 9/2018 | Gaertner .................. | F16J 1/001 |

FOREIGN PATENT DOCUMENTS

| | | |
|---|---|---|
| DE | 69606290 T2 | 5/2000 |
| DE | 19939873 A1 | 1/2001 |
| DE | 102007009514 A1 | 9/2007 |
| DE | 102007051456 A1 | 4/2009 |
| JP | S48012854 Y1 | 4/1973 |
| JP | S51000660 B1 | 1/1976 |
| JP | 2005539189 A | 12/2005 |
| JP | 2011501073 A | 1/2011 |
| JP | 2011524505 A | 9/2011 |
| WO | 0102745 A1 | 1/2001 |

OTHER PUBLICATIONS

International Search Report and Written Opinion for International Application No. PCT/EP2016/050899, dated Apr. 18, 2016, 7 pages.
German Search Report for German Application No. 10 2015 208 732.8, dated Jun. 18, 2018, with partial translation, 10 pages.
Notification of Reasons for Refusal for Japanese Application No. 2017-536319, dated Jun. 27, 2018, with translation, 12 pages.

* cited by examiner

DOUBLE CUP-SHAPED PISTON FOR A DISC BRAKE

CROSS REFERENCE TO RELATED APPLICATIONS

This application is the U.S. National Phase Application of PCT International Application No. PCT/EP2016/050899, filed Jan. 18, 2016, which claims priority to German Patent Application No. 10 2015 200 623.9, filed Jan. 16, 2015 and German Patent Application No. 10 2015 208 732.8, filed May 11, 2015, the contents of such applications being incorporated by reference herein.

FIELD OF THE INVENTION

The invention relates to a piston for a disk brake having an electromechanical parking brake apparatus.

BACKGROUND OF THE INVENTION

Known pistons for disk brakes having an electromechanical parking brake apparatus are of single cup-shaped and multiple-piece construction and as a rule comprise a cylindrical cup with a base which is closed on the end side for resting on a rear plate of a friction lining. A separate bush is mounted in a received manner in the cup interior space of the piston which delimits the hydraulic working space, which bush is equipped with a conical bearing face for receiving a nut of an actuating apparatus, and a spindle/nut mechanism of an actuating apparatus also being received in the piston interior. Here, the conical bearing face of the bush cooperates with a conical counterpart of the spindle/nut mechanism.

SUMMARY OF THE INVENTION

The invention aims to provide an improved compromise between facilitated handleability, rationalized component logistics in the piston production, reduced hydraulic volume use in cooperation with the wheel brake periphery, and extended fatigue strength with a maximum loading collective, in particular for the heavy load applications of a disk brake having an electromechanical parking brake apparatus.

DETAILED DESCRIPTION OF THE PREFERRED EMBODIMENTS

Figure 1:
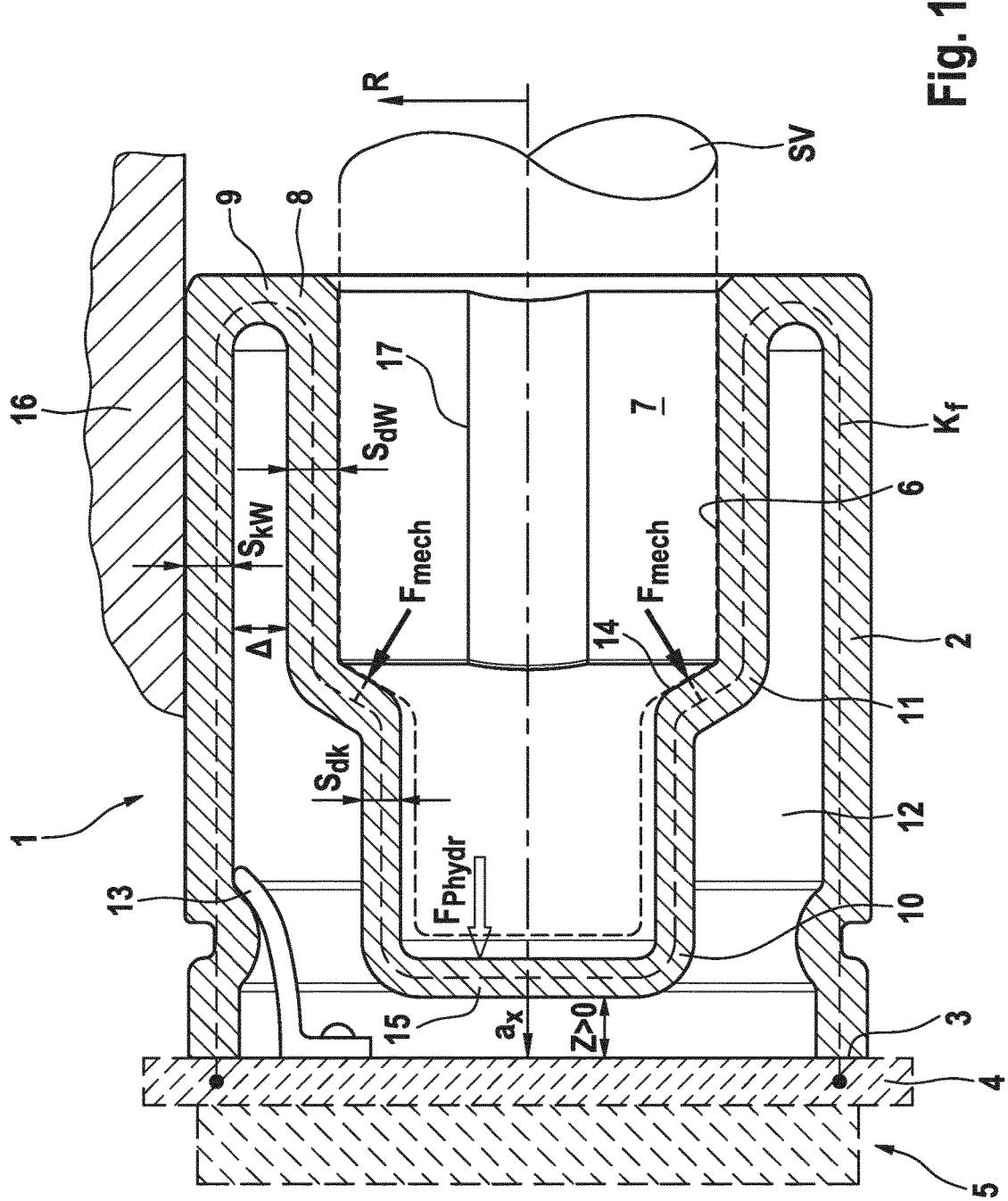
FIG. 1 shows a section through a piston according to the invention.
Figure 2:
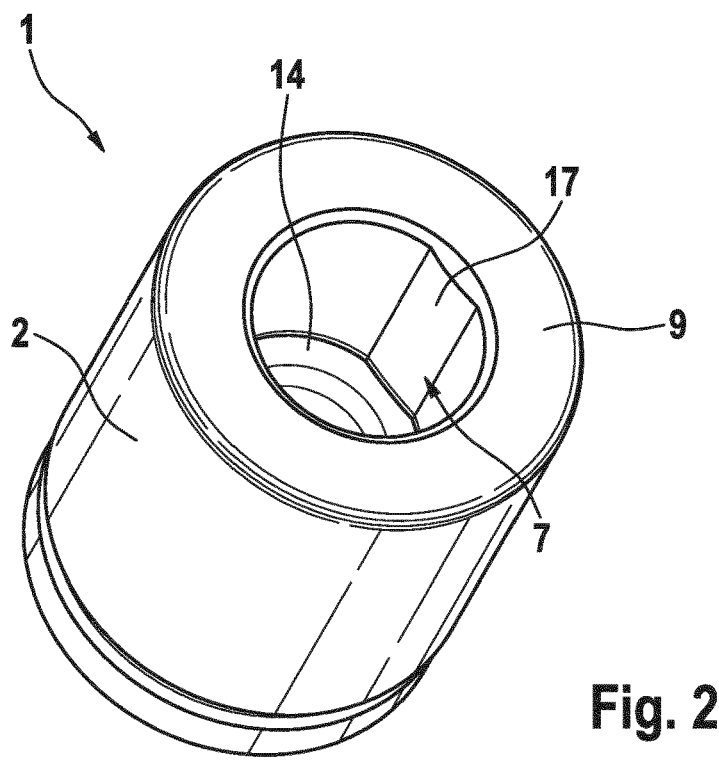
FIG. 2 shows a perspective view of the piston according to FIG. 1 from the right.
Figure 3:
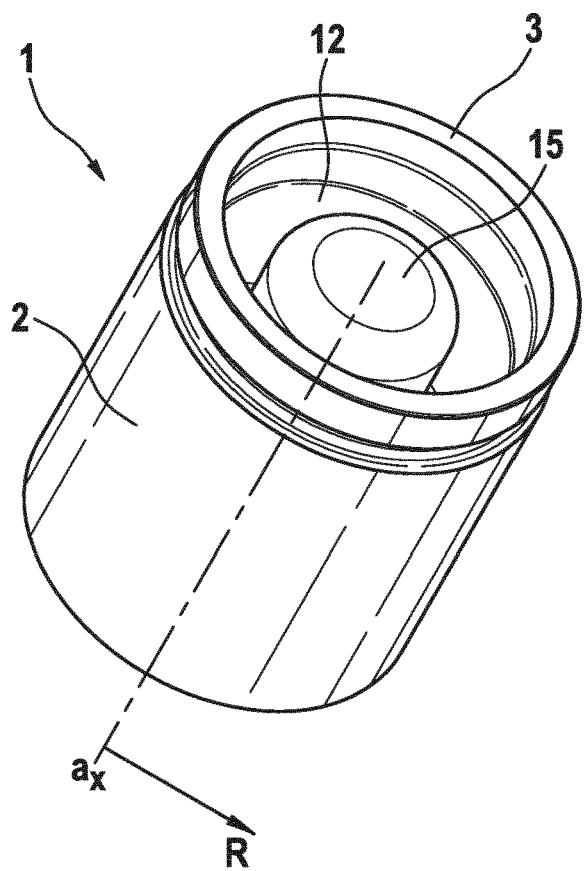
FIG. 3 shows a perspective view of the piston according to FIG. 1 from the right.

According to an aspect of the invention, a double cup-shaped piston 1 is proposed for the first time, the piston wall 2 of which is seated with a free edge 3 firstly on a rear plate 4 of the friction lining 5, and the piston 1 secondly having a dome 6 which forms an open receptacle 7 for an indicated electromechanical actuating apparatus SV diametrically with respect to the edge 3 of the piston 1. An aspect of the invention offers added value because transverse force influences, alignment errors, faulty angular setting, divergences between the piston axis ax and the action of force can be neutralized by means of quasi-elastic deformation of the dome 6. As a consequence, the force flow in the system is optimized and at the same time a spindle/nut mechanism of the actuating apparatus SV is received and protected particularly favorably.

In one advantageous refinement of the invention, the dome 6 is configured centrically with respect to the piston wall 2 and in one piece with the latter, and preferably forms an independent receptacle cavity (receptacle 7) in the piston interior, which receptacle cavity receives, in a separated manner, the actuating apparatus SV or at least one nut of the actuating apparatus which can be displaced axially together with the piston 1 and is held fixedly on the piston 1 so as to rotate with it. Here, a dome base 8 is advantageously provided such that it is positioned in one piece on the piston crown 9.

A dome top 10 ends at a spacing z from the free edge 3 of the piston wall 2. In other words, an overall length of the dome 6 is of shorter configuration than an overall length of the piston 1.

A dome wall 11 is provided at a radial spacing from the piston wall 2 and centrically and in sections parallel with respect to the latter, and reaches through a large part of the piston interior space. In order to reduce tilting or transverse force influences, the contour of the dome wall 11 is elongate, and the location for feeding in compressive force between the nut and the dome wall 11 is positioned toward the top, that is to say as far as possible in the axial direction ax in the direction of the dome top 10. Consequently, the hydraulic working space (cf. 7) which is formed is separated from the clearance 12 by way of the dome wall 11 in the manner of a fixed diaphragm, which clearance 12 adjoins the rear plate 4 of the friction lining 5. Accordingly, starting from the piston axis ax in the direction radially to the outside R, the piston 1 has a plurality of partially overlapping wall sections. The contour of the spaces which are configured in the piston 1 (working space, clearance 12) is designed largely without undercuts and in a widened manner (conical/divergent) toward the respective opening with a profiling 17. As a result, the drawing of the piston in opposite directions along the piston axis ax from a planar metallic sheet metal material with the aid of a deep drawing mandrel, a die and a counterpunch/drawing cushion is made possible at room temperature, or, as an alternative, cold forming can be carried out with the utilization of work hardening. The clearance 12 which is formed preferably serves for mechanical and thermal decoupling and can be used in addition to the arrangement of an indicated lining holding spring 13. An improved friction lining restoring action (residual braking moment avoidance) during the hydraulic or electromechanical release of the wheel brake is made possible by way of the connection between the friction lining 5 and the piston 1. It goes without saying that the volume of the two spaces which are separated from one another can be of different dimensions depending on requirements, in order to assist different optimizations. As a rule, the volume ratio of the two spaces will be approximately 1:1.

At least one section of the dome wall 11 can be stretched, that is to say subjected to tensile stress. At least one section of the dome wall 11 can be configured for feeding in compressive force via the nut of the actuating apparatus in a conical manner (cf. cone 14). At least one further section of the dome wall 11 can be of non-round profiled configuration (profile 15) for positively locking action (rotary locking) on the nut, such as can have, in particular, one or more key faces. The force deflection and the quasi-elastic deformation of the dome wall 11 under the given tensile stress (hydraulic and/or electromechanical loading) can be provided in a manner which is decoupled in force terms by way of a radially contact-free spacing Δ from the piston wall 2. Accordingly, both wall sections and spaces can be optimized with simplified logistics and a single-piece overall design with regard to their respective tasks (piston wall: piston guiding function, compressive force transmission to the friction lining; dome wall: spindle/nut cooperation), without influencing one another mutually. A tilting or buckling tendency of the actuating apparatus SV is reduced.

Hydraulic and electromechanical brake application forces are bundled into the piston crown 9 via the dome wall 11 (under tensile stress) and the dome base 8 (under tensile stress), and are introduced from there into the piston wall 2 (compressive stress), in order to pass via the free edge 3 (with compressive stress) to the rear plate 4 of the friction lining 1 (cf. force flow Kf). The dome base 10 is configured in a cylindrical/cup-shaped depressed manner and with a planar base face 15 for spindle receiving in a maximum adapted manner. The hydraulic working space can be provided to be as great as absolutely necessary without separate insert parts, as a result of the correspondingly favorable tight bearing of the dome contour against the adjoining peripheral components of the actuating apparatus SV. In other words, it is possible to incidentally save unnecessary hydraulic volume in the working space, that is to say unnecessary hydraulic pressure medium. Therefore, the hydraulic working space in the dome 6 can be reduced in an optimum manner if the contour of the dome 6 largely follows the contour of the actuating apparatus SV. A brake fluid requirement can be reduced particularly favorably without additional complexity by way of largely congruent shaping of the dome wall 11 and the spindle/nut mechanism.

In the following text, some positive effects and features of the invention will be highlighted again:
1. A novel elasticity is made possible by way of the double cup-shaped wall deflection according to the invention of the piston with protuberance of a dome 6 for the purpose of delimiting two axially overlapping, integral spaces. At the same time, at that end of the piston wall 2 which is remote from the lining, particularly favorable feeding in of (compressive) force, transmitted in the manner of a lever, at the radius of the piston wall 2 and its forwarding as far as the free edge 3 with respect to the piston contact face are made possible.

(Transverse/tilting) loading of the actuating apparatus SV is avoided/reduced by way of "top-heavy" feeding in of the actuating apparatus SV and improved, decoupled piston guidance in the brake housing 16.
2. Angular (faulty positioning) compensation between the actuating apparatus (spindle/nut mechanism SV) and the piston 1 by way of a quasi-elastic piston design.
3. Reduction of the hydraulic volume of the working chamber is made possible.
4. Novel possibility of integral positioning of a lining holding spring 13 in the clearance 12=>By way of the lining holding spring 13, it is made possible for the first time in the case of the wheel brakes which can be actuated in a combined manner that the friction lining can participate in a release movement of the piston. Accordingly, the advantage is achieved that residual brake moments in the case of a released brake are avoided or reduced.
5. Possibility of a particularly loading-suitable wall thickness adaptation (for example, Sdk≤Sdw≤SKw) by way of chipless deep drawing/elongation (sheet metal molding) or chipless cold forming of metallic material for particularly loading-suitable, easy and efficient and chip-avoiding component production. A reduction in the piston weight is made possible.
6. No impairment of piston guidance in the brake housing 16 under high brake application forces (decoupling). "Piston seizures" are avoided.
7. Utilization of metallic work hardening for loading-suitable, partial component hardening.

Expedient measures:
1. Decoupling clearance 12 between the piston wall 2 and the dome 6. The dome 6 forms a separated receptacle 7 for the actuating apparatus SV in the piston interior space.
2. Axial spacing Z>0 between the lining-side piston contact area and the dome top 10/dome top base 15. The dome top base 15 defines the axial spacing z in relation to the free edge 3/the piston contact area on the lining rear plate 4. The dome top base 15 therefore always retreats behind the free edge 3 of the piston wall 2 by the amount z in the axial direction ax. This ensures that a defined axial contact between the piston 1 and the rear plate 4 is guaranteed exclusively in the region of the piston contact area, even under very high electromechanical and/or hydraulic loading.

LIST OF DESIGNATIONS

1 Piston
2 Piston wall
3 Free edge
4 Rear plate
5 Friction lining/brake lining
6 Dome
7 Receptacle (cavity)
8 Dome base
9 (Piston) crown
10 Dome top
11 Dome wall
12 Clearance
13 Lining (holding) spring
14 Cone
15 Profile
16 (Brake) housing
17 Profiling
Ax Axial direction/piston axis
R Radial direction
Sdk Wall thickness, dome top
SdW Wall thickness, dome wall
SkW Wall thickness, piston wall
Δ (Radial) spacing between the piston wall and the dome wall
Z (Axial) spacing between the dome top base and the free edge
SV Actuating apparatus (symbolical)
Kf Force flow
Fphydr. Hydraulic force component
Fmech (Electro-)mechanical force component

The invention claimed is:
1. A double cup-shaped piston, for a disk brake comprising an electromechanical parking brake apparatus, the double cup-shaped piston comprising:
　a piston wall which is provided to be seated with a free edge firstly on a rear plate of a friction lining, and
　an integral dome starting from a piston crown, which dome forms an open receptacle for an actuating apparatus of the electromechanical parking brake apparatus diametrically with respect to the edge of the piston, wherein at least one section of a wall of the dome is of conical configuration in order to feed in compressive force via the electromechanical actuating apparatus.

2. The double cup-shaped piston in accordance with claim 1, wherein the dome is configured centrically with respect to the piston wall and in one piece with the latter, and forms an independent receptacle cavity in the piston interior, which receptacle cavity receives the actuating apparatus or at least one component of the actuating apparatus in a separated manner.

3. The double cup-shaped piston as claimed in claim 2, wherein the dome is arranged with a dome base in one piece on the piston crown.

4. The double cup-shaped piston as claimed in claim 1, wherein the positioning of the dome top at an axial spacing z from the free edge of the piston wall ends in such a way that an overall length of the dome is of a shorter configuration than an overall length of the piston.

5. The double cup-shaped piston as claimed in claim 1, wherein at least one other section of the wall of the dome is provided at a radial spacing from the piston wall and centrically and in sections parallel with respect to the latter, in order to reach through a large part of the piston interior space.

6. The double cup-shaped piston as claimed in claim 5, wherein a hydraulic working space is separated from a clearance by way of the wall of the dome in a diaphragm-like manner, a plurality of wall sections which partially overlap mutually being formed.

7. The double cup-shaped piston as claimed in claim 1, wherein a contour of the spaces which are provided integrally in the piston in a separated manner is configured without undercuts and in a widened manner toward the respective opening in order to perform deep drawing operations which are oriented in opposite directions in an axial direction of the piston.

8. The double cup-shaped piston as claimed in claim 1, wherein the friction lining is connected mechanically to the piston.

9. The double cup-shaped piston as claimed in claim 1, wherein respective volumes of the two spaces in the piston which are separated from one another are of different dimensions.

10. The double cup-shaped piston as claimed in claim 1, wherein at least one other section of the wall of the dome is of non-round, profiled configuration for acting on the electromechanical actuating apparatus in a positively locking manner.

11. The double cup-shaped piston as claimed in claim 1, wherein the wall of the dome is provided in a manner which is decoupled from the radial force by way of a radial contact-free spacing $\Delta$ from the piston wall.

12. The double cup-shaped piston as claimed in claim 1, wherein the dome is arranged with a dome base in one piece on the piston crown.

13. The double cup-shaped piston as claimed in claim 1, wherein a contour of the spaces which are provided integrally in the piston in a separated manner is configured without undercuts and in a widened manner toward the respective opening in a conical and/or divergent manner in order to perform deep drawing operations which are oriented in opposite directions in an axial direction of the piston.

* * * * *